United States Patent
Blann et al.

(10) Patent No.: US 7,285,607 B2
(45) Date of Patent: Oct. 23, 2007

(54) POLYMERISATION OF OLEFINIC COMPOUNDS

(75) Inventors: Kevin Blann, Alberton (ZA); Deon De Wet-Roos, Meyerton (ZA); Dawid Johannes Joubert, Vaalpark (ZA); Esna Killian, Sasolburg (ZA); John Thomas Dixon, Vanderbijlpark (ZA); Nonhlanhla Jillian Phelembe, Vanderbijlpark (ZA); Aletta Du Toit, Vaalpark (ZA)

(73) Assignee: Sasol, Chemical Industries, Limited, Johannesburg (ZA)

( * ) Notice: Subject to any disclaimer, the term of this patent is extended or adjusted under 35 U.S.C. 154(b) by 25 days.

(21) Appl. No.: 11/130,106

(22) Filed: May 17, 2005

(65) Prior Publication Data

US 2006/0020091 A1    Jan. 26, 2006

(30) Foreign Application Priority Data

May 18, 2004  (ZA)  ................................ 2004/3805

(51) Int. Cl.
| | | |
|---|---|---|
| C08F 4/74 | (2006.01) | |
| C08F 4/76 | (2006.01) | |
| C08F 4/78 | (2006.01) | |
| C08F 10/00 | (2006.01) | |
| C08F 4/622 | (2006.01) | |
| C08F 4/69 | (2006.01) | |

(52) U.S. Cl. ...................... 526/145; 526/146; 526/147; 526/161; 526/172; 526/139; 526/141; 502/103; 502/121; 502/122; 502/123

(58) Field of Classification Search ............... 526/145, 526/166, 161, 172, 147, 146, 139, 141; 502/103, 502/121, 122, 123

See application file for complete search history.

(56) References Cited

U.S. PATENT DOCUMENTS

| | | | | |
|---|---|---|---|---|
| 6,800,702 | B2 * | 10/2004 | Wass | ........................ 526/124.3 |
| 7,022,788 | B2 * | 4/2006 | Wass | ........................... 526/172 |
| 2005/0113622 | A1 * | 5/2005 | Drent et al. | ................. 585/521 |
| 2006/0211903 | A1 * | 9/2006 | Blann et al. | ................. 585/511 |

* cited by examiner

*Primary Examiner*—Caixia Lu
(74) *Attorney, Agent, or Firm*—Finnegan, Henderson, Farabow, Garrett & Dunner, L.L.P.

(57) ABSTRACT

This invention relates to a process for producing a polymeric product by the polymerisation of at least one olefinic compound in the form of an olefin or a compound including an olefinic moiety by contacting the at least one olefinic compound with a polymerisation catalyst. The catalyst comprises the combination of a source of a Group IV to VI transition metal; and a ligating compound of the formula $(R^1)_m X^1 (Y) X^2 (R^2)_n$.

The process is characterised therein that when $R^1$ and $R^2$ are independently a hydrocarbyl group or a heterohydrocarbyl group which contains at least one non-polar substituent, the olefinic compound is contacted with the polymerisation catalyst at a reaction temperature from and above 70° C.; and where $R^1$ and $R^2$ are independently a hydrocarbyl group or a heterohydrocarbyl group which contains no substituent, the olefinic compound is contacted with the polymerisation catalyst at a reaction temperature from and above 90° C.

27 Claims, 1 Drawing Sheet

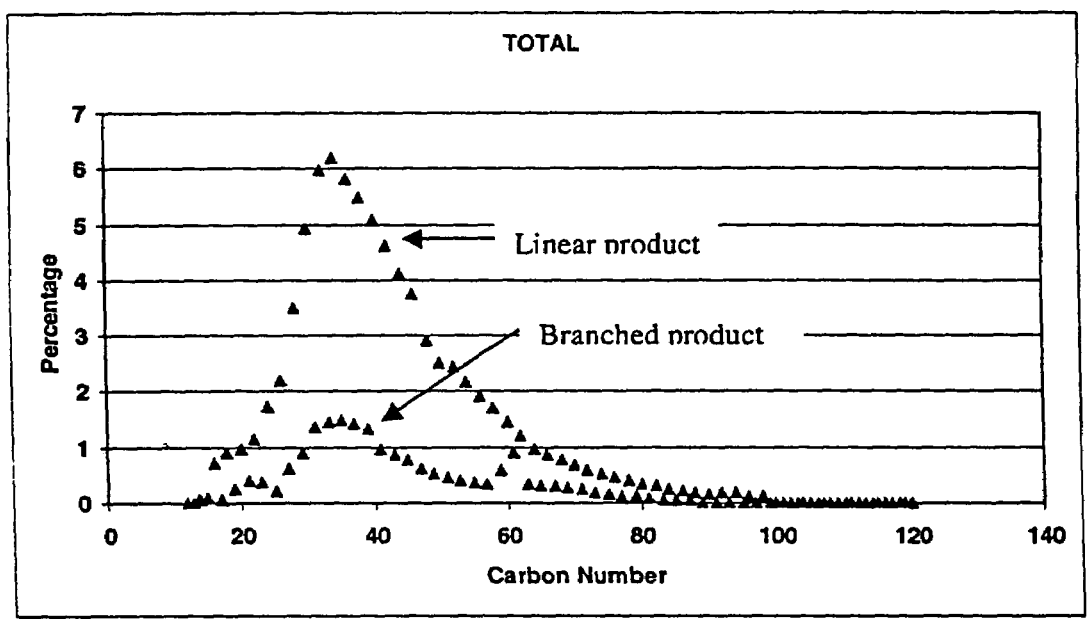
Figure 1. Carbon number distribution of experiments using bis(diphenylphosphino) isopropylamine as ligand in combination with Cr(AcAc)₃ to produce waxes with broad melting point ranges and low melting point peaks. (Example 24 in Table 2)

POLYMERISATION OF OLEFINIC COMPOUNDS

TECHNICAL FIELD

This invention relates to the polymerisation of olefinic compounds in the presence of a polymerisation catalyst to produce polymers, including waxes.

BACKGROUND TO THE INVENTION

The use of metallocene and Ziegler-Natta catalysts for the production of linear polyethylene and polypropylene polymers and waxes is well known in the art and the conditions to produce branched and linear waxes using single site metallocene catalysts have been described extensively. Typically, when Ziegler-Natta catalysts are used, waxes are produced by carrying out reactions at high temperatures (100-200° C.) in the presence of hydrogen as chain transfer agent. Reactions involving metallocene catalysts occur at lower temperatures and the degree of polymerisation is controlled by controlling the ratio of co-catalyst or activator to the polymerisation catalyst.

Specific examples in the prior art for the production of waxes include US 2003/171481 that discloses the synthesis of a functionalised wax based on vanadium and metallocene catalysts. JP 2003286308 discloses the use of metallocene catalysts with cyclopentadienyl backbones as ligands for the synthesis of narrow polydispersity polyolefin waxes of ethylene and propylene. Similarly, U.S. Pat. No. 5,023,388 discloses a process of synthesising a wax with narrow polydispersity using a metallocene catalyst. Last mentioned document discloses that hydrogen is used to regulate the molecular weight. In another example of a typical Ziegler-Natta based process (GB1444736), controlled polymerisation was conducted in the presence of the catalyst combinations $TiCl_4/Mg(OEt)_2/AlEt_3$ or $Ti(O\text{-}i\text{-}Pr)_4/Mg(OEt)_2/AlEt_3/SiCl_4$ and hydrogen.

Waxes produced using single site catalysts have a molecular weight range between 500 and 5000 $g.mol^{-1}$ (JP 2003201436) and densities lower than 0.915 $g.cm^{-3}$ (JP 2002256006).

On the other hand, the use of ligands containing Group V and/or VI ligating atoms such as P, N, O or S with a suitable transition metal is not well known. WO 01/10876 A1 (BP Chemicals Ltd) discloses a process for the polymerisation and copolymerisation of olefins in the presence of a polymerisation catalyst or system comprising a source of a Group VIII transition metal such as nickel, and a bidentate phosphine ligand, the reactions being carried out at room temperature or 50° C. US 2003/0149198 $A_1$ (Chevron Phillips Chemical Co) discloses the use of tridentate ligands of formula A with a transition metal to produce oligomers and/or polymers:

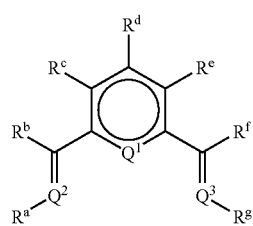

(A)

with $Q^1$, $Q^2$ and $Q^3$ being O, S, N or P.

WO 02/04119 (BP Chemicals Ltd) discloses a process for the trimerisation of olefins in the presence of a catalyst comprising a source of a Group III to X transition metal, and a ligand containing at least one P, As or Sb atom bound to at least one hydrocarbyl or heterohydrocarbyl group having a polar substituent, but excluding the case where all such polar substituents are phosphane, arsane or stilbane. No polymerisation of olefins was obtained.

WO 2004/056479 A1 and WO 2004/056477 A1 were published after the priority date of the present application. These applications disclose an olefin tetramerisation process and an olefin trimerisation process respectively. In both cases a catalyst system substantially the same as the catalyst system used in the present invention was used. However, it has now been established that by using different reaction conditions (notably the reaction temperature) from those disclosed in the above applications, polymerization of olefinic compounds can be obtained in the presence of such catalyst systems.

It is accordingly an object of the present invention to provide a process for the polymerisation of olefinic compounds.

SUMMARY OF THE INVENTION

According to the present invention there is provided a process for producing a polymeric product by the polymerisation of at least one olefinic compound in the form of an olefin or a compound including an olefinic moiety by contacting the at least one olefinic compound with a polymerisation catalyst wherein the catalyst comprises the combination of i) a source of a Group IV to VI transition metal; and ii) a ligating compound of the formula

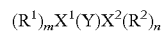

wherein: $X^1$ and $X^2$ are independently selected from the group consisting of P, As, Sb, O, Bi, S, Se and N;

Y is a linking group between $X^1$ and $X^2$, provided that where Y includes or is at least one heteroatom (that is not being H or C) in the shortest link between $X^1$ and $X^2$, then at least one of the said heteroatoms is not a ring member of a heteroaromatic ring structure;

m and n are independently 0, 1 or a larger integer;

$R^1$ and $R^2$ are independently a hydrocarbyl group or a heterohydrocarbyl group which contains no polar substituent, and $R^1$ being the same or different when m>1, and $R^2$ being the same or different when n>1; and the process being characterised therein that when $R^1$ and $R^2$ are independently a hydrocarbyl group or a heterohydrocarbyl group which contains at least one non-polar substituent, the olefinic compound is contacted with the polymerisation catalyst at a reaction temperature of at least 70° C.; and where $R^1$ and $R^2$ are independently a hydrocarbyl group or a heterohydrocarbyl group which contains no substituent, the olefinic compound is contacted with the polymerisation catalyst at a reaction temperature of at least 90° C.

BRIEF DESCRIPTION OF THE DRAWING

FIG. 1 is a graph of the carbon number distribution of products obtained from reactions involving bis(diphenylphosphino) isopropylamine.

DETAILED DESCRIPTION OF THE INVENTION

In this specification, a polymer or polymeric product is defined as a compound formed by linking one or more types of monomer molecules with molecular weights below 500 Daltons together to obtain linear or branched molecules containing 5 or more monomer units. A wax is a polymer of which the number average molecular weight of the polymer chains is less than 10000 Daltons.

In this specification the term "polymerisation" is used to include a reaction of a single monomer compound or more than one monomer compound to yield a homopolymeric product or a co-polymeric product respectively, the polymeric product comprising at least five monomeric units having molecular weights below 500 Daltons.

Polymeric Product

The polymeric product may comprise a polyolefin, preferably a polyolefin wax.

The polymeric product may comprise a homopolymer. Alternatively it may comprise a co-polymer including a co-polymer produced from more than two different monomers.

In last-mentioned case some of the monomers may be formed in-situ, preferably by means of an oligomerisation process.

The polymeric product may comprise a polymer with a number average molecular weight from 500 to 2 000 000 Dalton. Preferably the polymer chains of the polymeric product has an number average molecular weight from 500 to 200 000 Dalton. Preferably the polymeric product is a wax with a number average molecular weight from 500 to below 10 000 Dalton.

The polymeric product may be branched or non-branched.

In one preferred embodiment of the invention the polymeric product may be polyethylene or polypropylene and preferably it is polyethylene wax or polypropylene wax.

Olefinic Compound

The olefinic compound may comprise a single olefinic compound or a mixture of olefinic compounds.

In one embodiment of the invention the olefinic compound may comprise one single olefinic compound.

The olefinic compound may be an olefin and the olefin may include multiple carbon-carbon double bonds, but preferably it comprises a single carbon-carbon double bond. The olefin may comprise an α-olefin with 2 to 30 carbon atoms, preferably 2 to 10 carbon atoms. The olefinic compound may be selected from the group consisting of ethylene, propylene, 1-butene, 1-pentene, 1-hexene, styrene, 1-heptene, and 1-octene, 1-nonene, 1-decene, 3-methyl-1-butene, 3-methyl-1-pentene, 4-methyl-1-pentene, p-methyl styrene, 1-dodecene or combinations thereof. Preferably it comprises ethylene or propylene, preferably ethylene. The ethylene may be used to produce polyethylene, and propylene may be use to produce polypropylene.

In an alternative embodiment of the invention, the olefinic compound may comprise more than one olefin. When the olefinic compound comprises more than one olefin, one of the olefins may have more than one unsaturated carbon to carbon bond. One of the olefins may have two unsaturated carbon to carbon bonds, of which one is a terminal carbon to carbon bond and the other is an internal carbon to carbon bond. One of the olefins may be selected from the group consisting of 1,5 hexadiene, 1,7 octadiene and 1,4 hexadiene. Alternatively, both olefins may have a single carbon to carbon double bond and one of the olefins may be ethylene and the other olefin may be an olefin with a terminal carbon to carbon double bond.

Reaction Temperature

The applicant has surprisingly found that when $R^1$ and $R^2$ of the ligating compound contain no substituent, a high yield of polymeric product is attained at a higher temperature relative to when $R^1$ or $R^2$ contains a non-polar substituent.

Thus when $R^1$ and $R^2$ of the ligating compound contains no substituent, the reaction temperature is preferably at least 90° C., more preferably from 100 to 300° C., more preferably from 100 to 200° C. Preferably the reaction temperature is above the melting point of the polymeric product formed.

When $R^1$ or $R^2$ of the ligating compound contains a non-polar substituent, the reaction temperature is preferably at least 80° C., more preferably from 100 to 300° C., more preferably from 100 to 200° C. Preferably the reaction temperature is above the melting point of the polymeric product formed.

Polymerisation Catalyst

Source of Transition Metal:

The source of Group IV to VI transition metal is preferably a source of Cr, Ti, Hf, V or Zr. Preferably it is a source of V, Cr or Ti. Most preferably it is a source of Cr.

The source of the Group IV to VI transition metal may be an inorganic salt, an organic salt, a coordination compound or an organometallic complex.

Preferably the source of transition metal is a source of chromium and preferably it is selected from the group consisting of chromium trichloride tris-tetrahydrofuran complex; (benzene)tricarbonyl chromium; chromium (III) octanoate; chromium hexacarbonyl; chromium (III) acetylacetonoate and chromium (III) 2-ethylhexanoate. Preferably it is selected from (III) acetylacetonoate and chromium (III) 2-ethylhexanoate.

Alternatively the source of transition metal is a source of titanium, preferably a titanium salt, preferably titanium halide, preferably titanium tetrachloride.

Ligating Compound:

$X^1$ and/or $X^2$ may be a potential electron donor for coordination with the transition metal.

An electron donor is defined as an entity that donates electrons used in chemical, including dative covalent, bond formation.

$X^1$ and/or $X^2$, may be independently oxidised by S, Se, N or O.

$X^1$ and/or $X^2$ may be independently phosphorus or phosphorus oxidised by S or Se or N or O. Preferably $X^1$ and $X^2$ are the same, preferably both are P.

It will be appreciated that m and n are dependent on factors such as the valence and oxidation state of $X^1$ and $X^2$, bond formation of Y with $X^1$ and $X^2$ respectively, and bond formation of $R^1$ and $R^2$ with $X^1$ and $X^2$ respectively.

The ligating compound may comprise a bidentate ligand.

Preferably the ligating compound is of the formula $$\begin{array}{cc} R^3 & R^5 \\ \diagdown & \diagup \\ X^1 - Y - X^2 \\ \diagup & \diagdown \\ R^4 & R^6 \end{array}$$

wherein $X^1$, $X^2$, Y, are as defined above; and $R^3$ to $R^6$ is each independently a hydrocarbyl group or a heterohydrocarbyl group which includes no polar substituent.

Preferably $X^1$ and $X^2$ are independently selected from the group consisting of P, S, As, Sb, Bi and N. Preferably $X^1$ and $X^2$ are the same. Preferably both $X^1$ and $X^2$ are P.

$R^3$ to $R^6$ may be independently selected from the group consisting of a non-aromatic compound; an aromatic compound; and a heteroaromatic compound. Preferably each of $R^3$ to $R^6$ is an aromatic or heteroaromatic compound, more preferably an aromatic compound (including a substituted aromatic compound). The aromatic compound or heteroaromatic compound may comprise phenyl or a substituted phenyl. Preferably at least one of, but preferably at least two, but preferably all of $R^3$ to $R^6$ are aromatic or heteroaromatic (preferably phenyl or substituted phenyl) and preferably one or more, but preferably all of $R^3$ to $R^6$ include a non-polar substituent other than H as a non-ring atom bound to a ring atom of the aromatic ring structure adjacent to the aromatic ring atom bound to $X^1$ or $X^2$. Preferably two or more of $R^3$ to $R^6$ include a non-polar substituent other than H as a non-ring atom bound to a ring atom of the aromatic ring structure adjacent to the aromatic ring atom bound to $X^1$ or $X^2$.

In this specification a non-polar substituent is a substituent without a permanent electric or induced dipole moment.

Examples of suitable non-polar substituents include, but are not limited to, methyl, ethyl, ethylenyl, propyl, propenyl, propynyl, butyl, cyclohexyl, 2-methylcyclohexyl, 2-ethylcyclohexyl, 2-isopropylcyclohexyl, benzyl, phenyl, tolyl, xylyl, o-methylphenyl, o-ethylphenyl, o-isopropylphenyl, o-t-butylphenyl, cumyl, mesityl, biphenyl, naphthyl, anthracenyl, and the like.

In one embodiment of the invention wherein each of $R^3$ to $R^6$ is an aromatic or heteroaromatic compound, none of said aromatic or heteroaromatic compounds are substituted.

Any one of $R^3$ to $R^6$ may be independently linked to one or more of each other, or to Y to form a cyclic structure.

In a preferred embodiment, each of $R^3$ to $R^6$ is independently selected from the group consisting of a benzyl, phenyl, tolyl, xylyl, mesityl, biphenyl, naphthyl, anthracenyl, methyl, ethyl, ethenyl, propyl, butyl, propenyl, propynyl, cyclopentyl, cyclohexyl, ferrocenyl and tetrahydrofuranyl group. Preferably $R^3$ to $R^6$, is independently selected from a group comprising a phenyl, tolyl, biphenyl, naphthyl, thiophenyl, methyl and ethyl group.

$R^3$ and $R^4$ may be the same and $R^5$ and $R^6$ may be the same. $R^3$ to $R^6$ may all be the same.

Y may be selected from any one of a group consisting of organic linking groups such as a hydrocarbylene, a substituted hydrocarbylene, a heterohydrocarbylene and a substituted heterohydrocarbylene; inorganic linking groups such as single atom links (that is $X^1$ and $X^2$ are bound to the same atom) or ionic links; methylene; dimethylmethylene; 1,2-ethylene; 1,2-phenylene; 1,2-propylene; 1,2-catecholate; —($CH_3$)N—N($CH_3$)—; —B($R^7$)—; —Si($R^7$)$_2$—; —P($R^7$)—; and —N($R^7$)—, where $R^7$ is hydrogen, a hydrocarbyl group, a substituted hydrocarbyl group, a heterohydrocarbyl group or a halogen. Preferably, Y may be —N($R^7$)— and $R^7$ is a hydrocarbyl or a substituted hydrocarbyl group. $R^7$ may be selected from the group consisting of hydrogen, alkyl, substituted alkyl, aryl, substituted aryl, aryloxy, substituted aryloxy, halogen, nitro, alkoxycarbonyl, carbonyloxy, alkoxy, aminocarbonyl, carbonylamino, dialkylamino, silyl groups or derivatives thereof, and aryl substituted with any of these substituents. Preferably $R^7$ may be a methyl, ethyl, propyl, butyl, pentyl or decylisopropyl, a 1-cyclohexylethyl, a 2-methylcyclohexyl or a 2-octyl group. In another embodiment of the invention $R^7$ may include any cyclic heteroatomic group such as cyclopentadienyl dimethylsilyl t-butylamidato or a cyclic homoatomic group such as cyclopentadienyl, indenyl and fluorene.

Y may exclude $(CH_2)_xY(CH_2)_y$, where Y is —P($R^8$)—, —N($R^8$)—, —As($R^8$)—, —Sb($R^8$)— or —S— and x and y are individually 1-15 and wherein $R^8$ is hydrogen or a halogen or a nitro group or a hydrocarbyl or a substituted hydrocarbyl group.

Y may include a first atom bound to $X^1$ and a different atom bound to $X^2$, for example in the case of 1,2-bis-(diphenylphosphino)-ethane. Preferably Y includes or is a single atom bound to both $X^1$ and $X^2$.

Preferably none of the atoms in the direct chain of Y between $X^1$ and $X^2$ form part of a heteroaromatic compound alternatively or additionally an aromatic compound. Preferably Y includes at least one heteroaromatic atom (that is neither H or C) in the direct chain of Y between $X^1$ and $X^2$ and preferably said heteroaromatic atom is different to $X^1$ and $X^2$. Preferably $X^1$ and $X^2$ are the same and said heteroaromatic atom is different to $X^1$ and $X^2$, preferably said heteroaromatic atom is N.

Non-limiting examples of the ligating compound are (phenyl)$_2$PN(methyl)P(phenyl)$_2$, (phenyl)$_2$PN(pentyl)P(phenyl)$_2$, (phenyl)$_2$PN(phenyl)P(phenyl)$_2$, (phenyl)$_2$PN(p-methoxyphenyl)P(phenyl)$_2$, (phenyl)$_2$PN(p-$^t$butylphenyl)P(phenyl)$_2$ (phenyl)$_2$PN(($CH_2$)$_3$—N-morpholine)P(phenyl)$_2$, (phenyl)$_2$PN(Si($CH_3$)$_3$)P(phenyl)$_2$, (((phenyl)$_2$P)$_2$NCH$_2$CH$_2$)$_2$N, (ethyl)$_2$PN(methyl)P(ethyl)$_2$, (ethyl)$_2$PN(isopropyl) P(phenyl)$_2$, (ethyl)(phenyl)PN(methyl)P(ethyl) (phenyl), (ethyl)(phenyl)PN(isopropyl)P(phenyl)$_2$, (phenyl)$_2$ P(=Se)N(isopropyl)P(phenyl)$_2$, (phenyl)$_2$PCH$_2$CH$_2$P (phenyl)$_2$, (o-ethylphenyl)(phenyl)PN (isopropyl) P(phenyl)$_2$, (o-methylphenyl)$_2$PN(isopropyl)P(o-methylphenyl)(phenyl), (phenyl)$_2$PN(benzyl)P(phenyl)$_2$, (phenyl)$_2$PN(1-cyclohexyl-ethyl)P(phenyl)$_2$, (phenyl)$_2$PN[$CH_2CH_2CH_2$Si(OMe3)]P(phenyl)$_2$, (phenyl)$_2$PN (cyclohexyl) P(phenyl)$_2$, (phenyl)$_2$PN(2-methylcyclohexyl) P(phenyl)$_2$, (phenyl)$_2$PN(allyl)P(phenyl)$_2$, (2-naphthyl)$_2$PN (methyl)P(2-naphthyl)$_2$, (p-biphenyl)$_2$PN(methyl)P(p-biphenyl)$_2$, (p-methylphenyl)$_2$PN(methyl)P(p-methylphenyl)$_2$, (2-thiophenyl)$_2$PN(methyl)P(2-thiophenyl)$_2$, (phenyl)$_2$PN(methyl)N(methyl) P(phenyl)$_2$, (m-methylphenyl)$_2$PN(methyl)P(m-methylphenyl)$_2$, (phenyl)$_2$PN(isopropyl)P(phenyl)$_2$, (phenyl)$_2$P(=S) N(isopropyl)P(phenyl)$_2$, (o-ethylphenyl)$_2$PN(methyl)P(o-ethylphenyl)$_2$, (o-isopropylphenyl)$_2$PN(methyl)P(o-isopropylphenyl)$_2$, (o-methylphenyl)$_2$PN(methyl)P(o-methylphenyl)$_2$, (o-ethylphenyl)$_2$PN(methyl)P(o-ethylphenyl)(phenyl), (o-ethylphenyl)$_2$PN(isopropyl)P(o-ethylphenyl)$_2$, (o-isopropyl)$_2$PN(isopropyl)P(o-isopropyl)$_2$, (o-methyl)$_2$PN(isopropyl)P(o-methyl)$_2$, (o-t-butylphenyl)$_2$PN (methyl)P(o-t-butylphenyl)$_2$, (o-t-butylphenyl)$_2$PN (isopropyl)P(o-t-butylphenyl)$_2$, (o-ethylphenyl)$_2$PN(pentyl) P(o-ethylphenyl)$_2$, (o-ethylphenyl)$_2$PN (phenyl)P(o-ethylphenyl)$_2$, (o-ethylphenyl)$_2$PN(p-methoxyphenyl)P(o-ethylphenyl)$_2$, (o-ethylphenyl)$_2$PN(benzyl) P(o-ethylphenyl)$_2$, (o-ethylphenyl)$_2$PN(1-cyclohexylethyl) P(o-ethylphenyl)$_2$, (o-ethylphenyl)$_2$PN(2-methylcyclohexyl)P(o-ethylphenyl)$_2$, (o-ethylphenyl)$_2$PN(cyclohexyl)P (o-ethylphenyl)$_2$, (o-ethylphenyl)$_2$PN(allyl)P(o-ethylphenyl)$_2$, (3-ethyl-2-thiophenenyl)$_2$PN(methyl)P(3-ethyl-2-thiophenenyl)$_2$, (2-ethyl-3-thiophenenyl)$_2$PN (methyl)P(2-ethyl-3-thiophenenyl)$_2$, 1,2-bis-(diphenylphosphino)-ethane, 1,3-bis-(diphenylphosphino)-propane, 1,4-bis-(diphenylphosphino)-butane, 1-(diphenylphosphino)-2-(ethylsulfanyl)-ethane and (2-ethyl-4-pyridyl)$_2$PN(methyl)P(2-ethyl-4-pyridyl)$_2$.

The ligating compound may include a polymeric moiety to render the reaction product of the source of transition metal and the said ligating compound to be soluble at higher temperatures and insoluble at lower temperatures e.g. 25° C. This approach may enable the recovery of the complex from the reaction mixture for reuse and has been used for other catalyst as described by D. E. Bergbreiter et al., *J. Am. Chem. Soc.*, 1987, 109, 177-179. In a similar vein these transition metal catalysts can also be immobilised by binding the ligating compound to silica, silica gel, polysiloxane or alumina backbone as, for example, demonstrated by C. Yuanyin et al., *Chinese J. React. Pol.*, 1992, 1(2), 152-159 for immobilising platinum complexes.

The ligating compound may include multiple ligating units or derivatives thereof. Non-limiting examples of such ligands include dendrimeric ligands as well as ligands where the individual ligating units are coupled either via one or more of the R groups or via the linking group Y. More specific, but not limiting, examples of such ligands may include 1,2-di-(N(P(phenyl)$_2$)$_2$)-benzene, 1,4-di-(N(P(phenyl)$_2$)$_2$)-benzene, N(CH$_2$CH$_2$N(P(phenyl)$_2$)$_2$)$_3$, 1,4-di-(P(phenyl)N(methyl)P(phenyl)$_2$)-benzene, 1,2-di -(N(P(o-ethylphenyl)$_2$)$_2$)-benzene, 1,4-di-(N(P(o-ethylphenyl)$_2$)$_2$)-benzene, N(CH$_2$CH$_2$N(P(o-ethylphenyl)$_2$)$_2$)$_3$ and 1,4-di-(P(o-ethylphenyl)N(methyl)P(o -ethylphenyl)$_2$)-benzene.

The ligating compounds may be prepared using procedures known to one skilled in the art and procedures forming part of the state of the art.

The polymerisation catalyst may be prepared in situ, that is in the reaction mixture in which the polymerisation reaction is to take place. Reaction mixture will be understood to include a reaction medium, reactants (olefinic compounds), reaction products and catalyst components. Typically the polymerisation catalyst will be prepared in situ. However it is foreseen that the catalyst may be pre-formed or partly pre-formed.

The source of transition metal and ligating compound may be combined (in situ or ex situ) to provide any suitable molar ratio, preferably a transition metal to ligand compound molar ratio, from about 0.01:100 to 10 000:1, preferably from about 0.1:1 to 10:1.

The process may also include combining one or more different sources of transition metal with one or more different ligating compounds.

The catalyst may also include one or more activators. Such an activator may be a compound that generates an active catalyst when the activator is combined with the source of transition metal and the ligating compound.

Suitable activators include organoaluminium compounds, organoboron compounds, organic salts, such as methyllithium and methylmagnesium bromide, inorganic acids and salts, such as tetrafluoroboric acid etherate, silver tetrafluoroborate, sodium hexafluoroantimonate and the like.

Suitable organoaluminium compounds include compounds of the formula Al(R$^9$)$_3$ (R$^9$ being the same or different), where each R$^9$ is independently a C$_1$-C$_{12}$ alkyl, an oxygen containing moiety or a halide, and compounds such as LiAlH$_4$ and the like. Examples include trimethylaluminium (TMA), triethylaluminium (TEA), tri-isobutylaluminium (TIBA), tni-n-octylaluminium, methylaluminium dichloride, ethylaluminium dichloride, dimethylaluminium chloride, diethylaluminium chloride, aluminium isopropoxide, ethylaluminiumsesquichloride, methylaluminiumsesquichloride, and aluminoxanes. Aluminoxanes are well known in the art as typically oligomeric compounds which can be prepared by the controlled addition of water to an alkylaluminium compound, for example trimethylaluminium. Such compounds can be linear, cyclic, cages or mixtures thereof. Mixtures of different aluminoxanes may also be used in the process.

Examples of suitable organoboron compounds are boroxines, NaBH$_4$, triethylborane, tris(pentafluorophenyl)borane, dimethylanilinium tetrakis (pentafluorophenyl) borate, tributyl borate and the like.

The activator may also be or contain a compound that acts as a reducing or oxidising agent, such as sodium or zinc metal and the like, or hydrogen or oxygen and the like.

The activator may be selected from alkylaluminoxanes such as methylaluminoxane (MAO) and ethylaluminoxane (EAO) as well as modified alkylaluminoxanes such as modified methylaluminoxane (MMAO). Modified methylaluminoxane (a commercial product from Akzo Nobel) contains modifier groups such as isobutyl or n-octyl groups, in addition to methyl groups.

The transition metal source and the aluminoxane may be combined in proportions to provide Al/transition metal molar ratios from about 1:1 to 10 000:1, preferably from about 1:1 to 1000:1, and more preferably from 1:1 to 500:1.

The process may include the step of adding to the catalyst system a trialkylaluminium compound in amounts of between 0.01 to 1000 mol per mol of alkylaluminoxane.

It should be noted that aluminoxanes generally also contain considerable quantities of the corresponding trialkylaluminium compounds used in their preparation. The presence of these trialkylaluminium compounds in aluminoxanes can be attributed to their incomplete hydrolysis with water. Any quantity of a trialkylaluminium compound quoted in this disclosure is additional to alkylaluminium compounds contained within the aluminoxanes.

The polymerisation catalyst or its individual components, in accordance with the invention, may also be immobilised by supporting it on a support material, for example, silica, alumina, MgCl$_2$, zirconia, artificial hectorite or smectorite clays such as Laponite™ RD or mixtures thereof, or on a polymer, for example polyethylene, polypropylene, polystyrene, or poly(aminostyrene). The catalyst can be formed in situ in the presence of the support material, or the support can be pre-impregnated or premixed, simultaneously or sequentially, with one or more of the catalyst components or the polymerisation catalyst. In some cases, the support material can also act as a component of the activator. This approach would also facilitate the recovery of the catalyst from the reaction mixture for reuse.

Process

The olefinic compound or mixture thereof to be polymerised according to this invention can be introduced into the process in a continuous or batch fashion.

The process may include a process for polymerisation of ethylene or propylene or a mixture of olefins to selectively yield polyolefin waxes and/or polymers.

The olefinic compound or mixture of olefinic compounds may be contacted with the polymerisation catalyst system at a pressure of 1 barg or higher, preferably greater than 10 barg, more preferably greater than 30 barg. Preferred pressure ranges are from 10 to 300 barg, more preferably from 30 to 100 barg.

The polymerisation process may include the step of mixing the components of the catalyst at any temperature between −20° C. and 250° C. in the presence or absence of an olefinic compound or mixture thereof. The preferred temperature range being from 20° C. to 150° C. The components of the catalyst may also be added separately and at different temperatures to allow for selective and controlled contact between the components. Some of the starting materials may be air/or moisture sensitive. It is therefore preferred to carry out the reaction in a dried inert atmosphere such as nitrogen, argon, helium and the like. In addition, dried, purified feed gases such as ethylene or other ethylenic feedstocks in gaseous form either individually or as mixtures may also be used to provide a dry atmosphere. Hydrogen may also be added individually or as a mixture with the inert gases or with the feed gases if required.

Preferably, the reaction conditions of the process are chosen such to produce polymers or waxes in high yield by selectively converting an ethylenic feedstock such as ethylene to higher molecular weight compounds that may be a polymer as defined previously or a wax as defined before and preferentially a wax with selectivity towards the production of wax.

Selectivity towards the synthesis of polymers or waxes can range from 30 wt % to 100 wt % and more specifically from 50 wt % to 90 wt % and preferably above 80 wt %.

The individual components constituting the polymerisation catalyst described herein may be combined simultaneously or sequentially in any order, and in the presence or absence of a solvent, in order to give a selective active polymerisation catalyst. The presence of an olefinic compound during the mixing of the catalyst components generally provides a protective effect which may result in improved catalyst performance.

The reaction products derived from the polymerisation reaction as described herein, may be prepared using the disclosed catalyst by a homogeneous liquid phase reaction in the presence or absence of an inert solvent, and/or by slurry reaction where the catalyst and the polymeric product is in a form that displays little or no solubility, and/or a two-phase liquid/liquid reaction, and/or a bulk phase reaction in which neat reagent and/or product olefins serve as the dominant medium, and/or gas phase reaction, using conventional equipment and contacting techniques.

The polymerisation reaction may also be carried out in an inert solvent. Any inert solvent that does not react with the activator can be used. These inert solvents may include any saturated aliphatic and unsaturated aliphatic and aromatic hydrocarbon and halogenated hydrocarbon. Typical solvents include, but are not limited to, benzene, toluene, xylene, cumene, heptane, methylcyclohexane, methylcyclopentane, cyclohexane, ionic liquids as well as the reagents and products formed during the reaction in a liquid state and the like.

The polymerisation reaction may be carried out in a plant which includes reactor types known in the art. Examples of such reactors include, but are not limited to, batch reactors, semi-batch reactors and continuous reactors. The plant may include, in combination a) a stirred or fluidised bed reactor system, b) at least one inlet line into this reactor for olefin reactant and the catalyst system, c) effluent lines from this reactor for polymerisation reaction products, and d) at least one separator to separate the desired polymerisation reaction products which may include a recycle loop for solvents and/or reactants and/or products which may also serve as temperature control mechanism, and wherein the catalyst system may include a heteroatomic coordination complex of a transition metal precursor and an activator, as described herein.

In another embodiment of this invention, a combination of reactors may be preferred where the first reactor may be a continuously stirred tank or fluidised bed reactor and the second reactor may be a batch, continuously stirred tank reactor or fluidised bed reactor or a plug-flow reactor.

The process may include the step of providing a source of hydrogen, preferably $H_2$ when the olefinic compound is contacted with the polymerisation catalyst. As described previously, hydrogen may be added as a mixture with inert gases or as a mixture with the feed gases such as for example ethylene or propene. It is well-known that hydrogen acts as a chain-transfer agent in addition-coordination polymerisation mediated by transition metal catalysts. The addition of hydrogen can therefore act as a further measure to control molecular weight and molecular weight distribution of the polymers and waxes produced by means of this invention.

The process may also include the step of contacting the olefinic compound with a further catalyst, preferably an oligomerisation catalyst. The oligomerisation catalyst may comprise any suitable catalyst such as for example the catalyst described in WO 2004/056479A1; WO 2004/056477A1; or WO 2004/056478A1 all of which are incorporated herein by reference.

The oligomerisation catalyst may comprise a trimerisation catalyst and/or a tetramerisation catalyst. In one embodiment of the invention it may comprise a tetramerisation catalyst.

The polymerisation catalyst and oligomerisation catalyst may be combined.

The process may include the step of first contacting the oligomerisation catalyst with the olefinic compound and thereafter adding the polymerisation catalyst. Preferably, the oligomerisation catalyst and polymerisation catalysts are mixed and subsequently contacted with the olefinic compound. The reaction may first be carried at a temperature which favours oligomerisation and thereafter the temperature may be increased to a temperature which favours polymerisation.

The invention also relates to the use of a polymerisation catalyst as set out above in the polymerisation of at least one olefinic compound. The invention also relates to polymer produced by the process as set out above.

The invention will now be further described by means of the following non-limiting examples.

EXAMPLES OF PRODUCING POLYOLEFIN WAXES

Examples 1 to 20

A stock solution of chromium (III) acetylacetonate (Cr(AcAc)$_3$) was made up to a concentration of 0.349 mol·dm$^{-3}$ in toluene. In addition a 0.511 mol·dm$^{-3}$ solution of bis(di(o-ethyl phenyl phosphino) methylamine was also made up in toluene. An amount equivalent to 0.01 mmol chromium acetylacetonate Cr(AcAc)$_3$ of the Cr(AcAc)$_3$ stock solution was combined with an amount equivalent to 0.015 mmol bis(di(o-ethyl phenyl phosphino) methylamine of the bis(di(o-ethyl phenyl phosphino) methylamine stock solution to form the catalyst precursor mixture. A 1 L autoclave was filled with 350 ml heptane as solvent and heated to the desired temperature as specified in Table 1. The catalyst precursor solution was stirred and an appropriate amount of a co-catalyst, methylaluminoxane (MAO) as described in Table 1 was added a-priori to form an active catalyst system.

The catalyst mixture was added to the autoclave under inert conditions after 15 minutes to allow for optimal catalyst activity. The autoclave addition port was closed and the ethylene supply line was opened while stirring commenced. The autoclave was pressurized to the required pressure as indicated in Table 1. The reaction was allowed to continue for 1 hour after which the addition of ethylene was stopped and the reactor cooled. The content of the reactor was discharged by means of a bottom-drain valve into a container containing acetone. After thorough washing with acetone, the product was filtered and collected for drying under vacuum. The product was dried for 12 h at 60° C. under vacuum. Results are provided in Table 1 and Table 1a.

vacuum. Of this wax sample, another 40 g lighter material was distilled off after a second distillation at a slightly higher applied vacuum. Vacuum on the distillation unit was controlled using a three-way valve with a low flow of nitrogen to provide inert conditions and a diaphragm pump capable of reaching 0.9 mbar. The temperature of the oil-bath for the rotavapor distillation unit was set at 140° C. All vapours were recovered in a cooling trap using liquid nitrogen as a coolant. Based on this preliminary mass balance, the selec-

TABLE 1

| Example | Operating Temperature (° C.) | Operating Ethylene Pressure (Bar) | MAO:Cr ratio (molar equivalents) | Density g·cm$^{-1}$ | Branching ($^{13}$C) | Catalyst Activity (g/g Cr/h) | Viscosity of Wax formed (cP, spindle, temperature) | Melting Point of Wax formed (° C.) |
|---|---|---|---|---|---|---|---|---|
| 1 | 140 | 30 | 350 | 0.9219 | — | 354410 | 590 cP, s18, 135° C. | 110.49 |
| 2 | 140 | 20 | 350 | 0.91795 | 2.73 | 229638 | 594 cP, s18, 135° C. | — |
| 3 | 140 | 10 | 350 | 0.854 | — | 129363 | 567 cP, s18, 135° C. | 87.01 |
| 4 | 120 | 30 | 350 | 0.9312 | 1.74 | 561767 | 830 cP, s18, 150° C. | 119.01 |
| 5 | 120 | 20 | 350 | 0.9284 | 1.88 | 506502 | 780 cP, s18, 150° C. | 117.84 |
| 6 | 120 | 10 | 350 | 0.925 | 2.41 | 293703 | 1620 cP, s18, 135° C. | 112.84 |
| 7 | 100 | 30 | 350 | 0.9346 | — | 674582 | 3215 cP, s18, 150° C. | 122.12 |
| 8 | 100 | 20 | 350 | 0.9341 | 1.28 | 440846 | 2820 cP, s18, 150° C. | 122.89 |
| 9 | 100 | 10 | 350 | 0.9316 | — | 407279 | 3545 cP, s18, 150° C. | 120.63 |
| 10 | 80 | 30 | 350 | 0.9329 | — | 349864 | 2700 cP, s18, 150° C. | 124.24 |
| 11 | 80 | 20 | 350 | 0.9396 | 1.43 | 192466 | — | 136.01 |
| 12 | 80 | 10 | 350 | 0.9327 | — | 327897 | — | 124.08 |
| 13 | 100 | 30 | 500 | 0.949 | — | 359874 | 791 cP, s18, 150° C. | 116.06 |
| 14 | 100 | 30 | 600 | 0.9623 | — | 210134 | 966 cP, s18, 150° C. | 123.48 |
| 15 | 100 | 30 | 1000 | 0.949 | — | 99536 | CP, s18, 150° C. | 120.55 |
| 16 | 100 | 30 | 300 | 0.949 | — | 270930 | 1388 cP, s18, 135° C. | 121.48 |
| 17 | 100 | 30 | 200 | 0.9454 | — | 207312 | — | — |
| 18 | 100 | 30 | 100 | 0.9275 | — | 108515 | — | — |
| 19 | 100 | 30 | 400 | 0.941 | — | 407951 | — | — |
| 20 | 100 | 30 | 300 | 0.9493 | — | 323620 | — | — |

Results of experiments carried out at various temperatures, co-catalyst concentrations and pressures to produce polyethylene waxes as described for examples 1 to 20 above. Viscosity experiments were done using a Brookfield viscometer with a S18 spindle. In Table 1, *** indicates values that are not available. Branching was determined using $^{13}$C NMR and is reported quantitatively as the mole % methyl branching.

TABLE 1a

| Sample | M$_w$ (g/mol) | M$_n$ (g/mol) | Polydispersity M$_w$/M$_n$ |
|---|---|---|---|
| Example 8, Table 1 | 2600 | 1200 | 2.09 |
| Repeat, Example 8 | 2600 | 1300 | 2.02 |
| Example 2, Table 1 | 940 | 420 | 2.21 |
| Repeat, Example 2 | 850 | 320 | 2.62 |
| Example 5, Table 1 | 1800 | 730 | 2.33 |
| Repeat, Example 5 | 1700 | 700 | 2.47 |

M$_n$: Number Average Molecular Weight,
M$_w$: Weight Average Molecular Weight.

Example 21

It is known from previous literature references that the catalyst system employed in this invention is active towards oligomerisation below temperatures of 60° C.[1] In this example therefore, the selectivity towards PE wax formation is demonstrated as a function of temperature. An experiment was conducted according to the procedure as described in examples 1 to 20 using reagent amounts similar to those in example 4 in Table 1. Although the reactor is usually filled to capacity, a provisional mass balance revealed that approximately 320 g ethylene reacted of which 300 g of wax was recovered after distilling off the solvent under light vacuum. Of this wax sample, another 40 g lighter material tivity in terms of converting the amount of ethylene directly into wax is 81.3 wt %.

[1] WO 04056478 and WO 04056479

Examples 22 to 31

An amount equivalent to 0.09 mmol Cr(AcAc)$_3$ of a Cr(AcAc)$_3$ stock solution (as prepared in example 1) in toluene was combined with an amount equivalent to 0.12 mmol bis(diphenyl phosphino) iso-propylamine dissolved in toluene to form the catalyst precursor mixture. Meanwhile, a 1 L autoclave was filled with 350 ml heptane as solvent and heated to the desired temperature as indicated in Table 2. The catalyst precursor solution was stirred and an appropriate amount of a co-catalyst, methylaluminoxane (MAO) equivalent to the amount of chromium as described in Table 2 was added a-priori to form an active catalyst system.

The catalyst mixture was added to the autoclave under inert conditions after 15 minutes to allow for optimal catalyst activity. The autoclave addition port was closed and the ethylene supply line was opened while stirring commenced and the autoclave was pressurised to the pressures indicated in Table 2. The reaction was allowed to continue for 1 hour after which the addition of ethylene was stopped and the reactor cooled. The content of the reactor was discharged by means of a bottom-drain valve into a container containing acetone. After thorough washing with acetone, the product was filtered and collected for drying under vacuum. The product was dried for 12 h at 60° C. under vacuum.

TABLE 2

| Example | Temp (° C.) | Pressure (bar) | MAO equivalent to Cr | Activity (g/g/Cr/h) | DSC Melting points |
|---|---|---|---|---|---|
| 22 | 120 | 30 | 350 | 9274 | 64.98 |
| 23 | 120 | 20 | 350 | 6410 | 67.09 |
| 24 | 100 | 30 | 350 | 10259 | 70.88 |
| 25 | 100 | 20 | 350 | 3141 | 85.68 |
| 26 | 100 | 10 | 350 | 2283 | 79.51 |
| 27 | 140 | 30 | 350 | 4251 | 61.99 |
| 28 | 140 | 20 | 350 | 2167 | 67.24 |
| 29 | 120 | 30 | 50 | 4223 | 56.16 |
| 30 | 120 | 30 | 100 | 10293 | 74.95 |
| 31 | 120 | 30 | 200 | 21441 | 71.84 |

Results of experiments using bis(diphenylphosphino) iso-propylamine as ligand to produce waxes Products obtained from the reactions involving bis(diphenylphosphino)isopropylamine were soft and waxy in appearance. A representative sample (from example 24) was subjected to high-temperature gas chromatographic analysis to determine if linear and branched material was present. The result is shown in FIG. 1.

Examples Using
bis(di(o-ethyl-phenyl)phosphino)methylamine and
Cr(AcAc)$_3$ Complex with Methylaluminoxane as
Catalyst to Produce Wax Copolymers Examples 32-96

The ability to copolymerize various comonomers with ethylene was investigated. In a dry atmospherically inert glovebox (<1 ppm H$_2$O and <1 ppm O$_2$), a stock solution of bis(di(o-ethyl-phenyl)phosphino)methylamine (o-EtPNP) was made by dissolving 30 mg o-EtPNP in 30 ml anhydrous toluene. In addition, 12 mg chromium acetylacetonate was weighed off and dissolved in 12 ml toluene. After dissolving the ligand and the chromium metal sources with stirring, 7.5 ml (7.5 mg o-EtPNP, 0.015 mmol) of the o-EtPNP stock solution and 3 ml (3 mg Cr(AcAc)$_3$, 0.0086 mmol) of the Cr(AcAc)$_3$ stock solution was transferred to a container and combined with 2.2 ml methylaluminoxane to form the active catalyst. The catalyst mixture was stirred for 15 minutes to allow for optimal catalyst activity.

After stirring the mixture, the catalyst mixture was immediately transferred to a 50 ml stainless steel bomb using a syringe. The stainless steel bomb was affixed to the autoclave under a nitrogen blanket and the contents introduced into the autoclave by means of ethylene pressure at the appropriate conditions of temperature and pressure as required.

The reactions were conducted in a jacketed 1 L Buchi autoclave equipped with a stirrer and temperature-regulating thermostatic oil bath. The mass of ethylene and comonomers (reported in accompanying tables) were added concurrently after the autoclave was pressurized to 20 bar with high purity nitrogen to act as balance gas. The addition of the monomers was controlled by calibrated mass flow meters. In cases where hydrogen was introduced, an amount of 400 mg hydrogen was added before addition of the monomers.

In the case of 1-hexene and 1-pentene as comonomers, these compounds were purified prior to use by passing through percolation columns containing neutral alumina to remove impurities.

After polymerization, the content of the autoclave was discharged into a container with acetone in order to precipitate the wax. The wax suspension was transferred to a fritted funnel, filtered under vacuum and dried for 12 hours at 60° C. in a vacuum oven.

The results are provided in Tables 3 to 11

TABLE 3

| Examples | Monomer Composition | Temp | Ethylene Pressure (bar) | Activity (g/g Cr/h) | Viscosity cP (s18) | DSC Melting points | Mp onset | Mp endset | (NMR mol % C$_3$ incorporation* |
|---|---|---|---|---|---|---|---|---|---|
| 32 | 126 g Et. 126 g Prop | 100 | 30 | 224823 | 224.5 cP, 12 rpm, 135° C. | *** | *** | *** | 5.78C3 |
| 33 | 98.5 g Et, 98.2 g Prop | 120 | 30 | 142194 | 104.3 cP, 12 rpm, 135° C. | 71.12 | 30.41 | 99.5 | *** |
| 34 | 196.4 g et, 98.2 g Prop | 100 | 30 | 362315 | 120.8 cP, 30 rpm, 150° C. | 89.65 | 31.96 | 110.24 | 4.65C3 |
| 35 | 162.5 g Et, 81.3 g Prop | 120 | 30 | 264234 | 176.3 cP, 30 rpm, 150° C. | 104.43 | 59 | 112.06 | 3.09C3 |
| 36 | 97.4 g Et. 195 g Prop | 80 | 30 | 163915 | 1622 cP, 1.5 rpm, 150° C. | 96 | 42.51 | *** | 6.27C3 |
| 37 | 86 g Et, 173 g Prop | 80 | 30 | 232705 | 174.3 cP, 6 rpm, 135° C. | 61.73 | *** | *** | 7.58C3 |
| 38 | 157.6 g Et, 78.8 g Prop | 80 | 30 | 166960 | 707 cP, 3 rpm, 135° C. | 103.26 | *** | *** | 2.24C3 |
| 39 | 156 g Et, 156 g Prop | 100 | 30 | 125310 | 749 cP, 3 rpm, 135° C. | 89.82 | *** | *** | 4.87C3 |
| 40 | 220.3 g Et, 110.3 g Prop | 80 | 30 | 310140 | 324.5 cP, 1.5 rpm, 150° C. | 105 | *** | *** | 1.87C3 |
| 41 | 220.3 g Et, 110.3 g Prop | 80 | 30 | 310140 | 324.5 cP, 1.5 rpm, 150° C. | 105 | *** | *** | 1.87C3 |
| 42 | 80.7 g Et, 161.2 g Prop | 80 | 30 | 110844 | 5150 cP, 0.3 rpm, 150° C. | 76.77 | *** | *** | 6.31C3 |
| 43 | 80.7 g Et, 161.2 g Prop | 80 | 30 | 110844 | 5150 cP, 0.3 rpm, 150° C. | 76.77 | *** | *** | 6.31C3 |

TABLE 3-continued

| Examples | Monomer Composition | Temp | Ethylene Pressure (bar) | Activity (g/g Cr/h) | Viscosity cP (s18) | DSC Melting points | Mp onset | Mp endset | (NMR mol % $C_3$ incorporation* |
|---|---|---|---|---|---|---|---|---|---|
| 44 | 78.5 g Et, 157.0 g Prop 300 mg H2 | 80 | 30 | 139955 | 136.8 cP, 12 rpm, 135° C. | 66.74 | *** | *** | *** |

Examples of Waxes Produced using 1-Propene as Comonomer. Viscosity experiments were done using a Brookfield digital viscometer equipped with a S18 spindle. In Table 3 *** indicates values that are not available. Branching was determined using $^{13}C$ NMR and is reported quantitatively as the mole % methyl branching

TABLE 4

| Example | Monomer Composition | Mn (g/mol) | Mv (g/mol) | Mw (g/mol) | Mp (g/mol) | Mz (g/mol) | polydispersity |
|---|---|---|---|---|---|---|---|
| 32 | 126 g Et, 126 g Prop | 39233 | 662555 | 77639 | 2153049 | 177918 | 1.97 |
| 33 | 98.5 g Et, 98.2 g Prop | 426 | 1825 | 2137 | 2569 | 2681 | 5.01 |
| 34 | 196.4 g et, 98.2 g Prop | 1967 | 3437 | 3370 | 4075 | 4498 | 1.71 |
| 35 | 162.5 g Et, 81.3 g Prop | 2249 | 3419 | 3328 | 3539 | 4291 | 1.48 |
| 36 | 97.4 g Et, 195 g Prop | 2368 | 3947 | 3929 | 4346 | 5472 | 1.66 |
| 37 | 86 g Et, 173 g Prop | 3429 | *** | 5444 | 4779 | 8596 | 1.59 |
| 38 | 157.6 g Et, 78.8 g Prop | 7166 | *** | 12745 | 13314 | 21786 | 1.78 |
| 39 | 156 g Et, 156 g Prop | 4119 | *** | 6211 | 6047 | 9859 | 1.51 |
| 40 | 220.3 g Et, 110.3 g Prop | 6024 | *** | 10708 | 10907 | 18604 | 1.78 |
| 41 | 220.3 g Et, 110.3 g Prop | 6024 | *** | 10708 | 10907 | 18604 | 1.78 |
| 42 | 80.7 g Et, 161.2 g Prop | 1147 | 3869 | 4364 | 4014 | 9797 | 3.86 |
| 43 | 80.7 g Et, 161.2 g Prop | 1147 | 3869 | 4364 | 4014 | 9797 | 3.86 |
| 44 | 78.5 g Et, 157.0 g Prop 300 mg H2 | 180 | 1492 | 2068 | 1542 | 2644 | 11.46 |

Molecular weights of selected examples of ethylene/propene copolymers. Molecular weight units are in g · $mol^{-1}$. In Table 4 *** indicates values that are not available.
$M_n$: Number Average Molecular Weight,
$M_w$: Weight Average Molecular Weight,
$M_v$: Viscosity-Average Molecular Weight,
$M_P$: GPC-Average Molecular Weight,
$M_z$: Z-Average Molecular Weight.

TABLE 5

| Example | Ethylene (gram) | Butene (gram) | Temp (° C.) | Ethylene Pressure Bar | Activity (g/g/Cr/h) | DSC Melting Points (° C.) | Mp onset (° C.) | Mp endset (° C.) |
|---|---|---|---|---|---|---|---|---|
| 45 | 32 | 16 | 120 | 29.5 | 8352 | 82.25 | 39.8 | 105.48 |
| 46 | 43.5 | 43.5 | 120 | 29.5 | 21363 | 81.25 | 34.96 | 107.73 |
| 47 | 54 | 27 | 100 | 29 | 9069 | 69.63 | 40.06 | 87.94 |
| 48 | 45 | 45 | 100 | 29 | 20892 | 106.23 | *** | 114.26 |
| 49 | 30 | 60 | 120 | 29 | 2463 | 65.19 | 27.36 | 95.35 |
| 50 | 30 | 60 | 100 | 29 | 6673 | 77.86 | 48.65 | 97.27 |
| 51 | 60 | 30 | 80 | 29 | 49466 | 107.08 | *** | *** |
| 52 | 45 | 45 | 80 | 29 | 29021 | 102.36 | *** | *** |
| 53 | 30 | 60 | 80 | 29 | 16414 | 71.32 | *** | *** |

Examples of Waxes Produced using 1-Butene as Comonomer. In Table 5 *** indicates values that are not available.

TABLE 6

| Example | Ethylene (gram) | Butene (gram) | Temp (° C.) | Ethylene Pressure (bar) | Activity (g/g/Cr/h) | DSC Melting points (° C.) | Mp onset (° C.) | Mp endset (° C.) |
|---|---|---|---|---|---|---|---|---|
| 54 | 60 | 30 | 120 | 29.5 | 34104 | 65.98 | 26.98 | 96.93 |
| 55 | 45 | 45 | 120 | 29.5 | 18116 | 57.17 | 24.3 | 90.17 |
| 57 | 60 | 30 | 100 | 29 | 32066 | 103.45 | 30.42 | 110.03 |
| 58 | 45 | 45 | 100 | 28 | 24319 | 72.19 | 35.48 | 100.37 |
| 59 | 30 | 60 | 100 | 28.6 | 7076 | 69.06 | 41.14 | 90.99 |
| 60 | 60 | 30 | 80 | 29.5 | 61737 | 104.31 | 58.36 | 4110.18 |

Examples of Waxes Produced using 1-Butene as Comonomer and 400 mg Hydrogen

TABLE 7

| Example | Ethylene (gram) | Butene (gram) | Temp (° C.) | Ethylene Pressure (bar) | Activity (g/g/Cr/h) | DSC Melting points (° C.) | Mp onset (° C.) | Mp endset (° C.) |
|---|---|---|---|---|---|---|---|---|
| 61 | 70 | 35 | 80 | 29.5 | 12831 | 117.7 | *** | *** |
| 62 | 38 | 38 | 80 | 29.5 | 8285 | 107.38 | 66.11 | 112.92 |
| 63 | 37.5 | 75 | 80 | 29.5 | 3807 | 92.31 | 57.64 | 111.54 |
| 64 | 52 | 26 | 100 | 29.5 | 18295 | 107.84 | 54.36 | 117.82 |
| 65 | 84 | 84 | 100 | 29.5 | 17645 | 103.68 | 48.72 | 112.24 |
| 66 | 48.1 | 96.2 | 100 | 29.5 | 4568 | 84.73 | 54.24 | 108.67 |
| 67 | 100 | 50 | 120 | 29.5 | 52197 | 86.013 | 63.42 | 105.44 |
| 68 | 75 | 75 | 120 | 29.5 | 20422 | 75.28 | 31.35 | 100.22 |
| 69 | 50 | 100 | 120 | 29.5 | 9047 | 68.82 | 41.36 | 96.46 |

Examples of Waxes Produced using 1-Pentene as Comonomer. In Table 7 *** indicates values that are not available.

TABLE 8

| Example | Ethylene (gram) | Butene (gram) | Temp (° C.) | Ethylene Pressure (bar) | Activity (g/g/Cr/h) | DSC Melting points (° C.) | Mp onset (° C.) | Mp endset (° C.) |
|---|---|---|---|---|---|---|---|---|
| 70 | 100 | 50 | 80 | 28.5 | 29693 | 111.077 | 87.029 | 114.209 |
| 71 | 75 | 75 | 80 | 27.5 | 24587 | 104.73 | 68.11 | 113.05 |
| 72 | 50 | 100 | 80 | 29.5 | 26043 | no definite Mp | | |
| 73 | 100 | 50 | 100 | 27 | 74881 | 101.92 | 45.57 | 109.23 |
| 74 | 75 | 75 | 100 | 29.5 | 21385 | 103.55 | 50.86 | 115.54 |
| 75 | 50 | 20 | 100 | 29.5 | 20557 | 73.96 | 33.21 | 100.88 |
| 76 | 100 | 50 | 120 | 29.5 | 59206 | 87.42 | 30.84 | 107.47 |
| 77 | 75 | 75 | 120 | 29.5 | 10233 | 79.13 | *** | 107/05 |
| 78 | 50 | 100 | 120 | 29.5 | 17489 | 57.59 | 25.77 | 93.96 |

Examples of Waxes Produced using 1-Pentene as Comonomer and 400 mg Hydrogen. In Table 8 *** indicates values that are not available.

TABLE 9

| Example | Ethylene (gram) | Hexene (gram) | Temp (° C.) | Ethylene Pressure (bar) | Activity (g/g/Cr/h) | DSC Melting points (° C.) | Mp onset (° C.) | Mp endset (° C.) | (NMR) mol % C6 incorporated |
|---|---|---|---|---|---|---|---|---|---|
| 79 | 39 | 39 | 120 | 29.7 | 5934 | 81.03 | 50.91 | 102.3 | 2.53C6/2.08C3 |
| 80 | 39 | 39 | 120 | 29.7 | | 86.51 | 34.44 | 104.77 | *** |
| 81 | 100 | 100 | 100 | 29.7 | 12853 | 103.34 | *** | 114.13 | *** |
| 82 | 100 | 100 | 80 | 29.7 | 16145 | 109.6 | *** | 116.85 | *** |
| 83 | 68 | 68 | 120 | 29.7 | 8532 | 84.45 | 39.37 | 110.58 | *** |
| 84 | 63.5 | 32 | 120 | 29.7 | 24923 | 91.27 | 41.76 | *** | *** |
| 85 | 100 | 50 | 80 | 29.7 | 57975 | 114.42 | *** | *** | *** |
| 86 | 100 | 50 | 100 | 29.7 | 79517 | 106.61 | *** | 119.46 | *** |
| 87 | 100 | 50 | 120 | 29.7 | 47002 | 104.17 | 46.58 | 112.42 | 1.17C6/1.6C3 |
| 88 | 50 | 100 | 120 | 29.7 | 10077 | no defined Mp | *** | *** | *** |
| 89 | 50 | 100 | 100 | 29.7 | 14443 | 77.76 | 36.85 | 103.59 | 2.89C6/0.34C3 |
| 90 | 50 | 100 | 80 | 29.7 | 14130 | 84.94 | 35.83 | 104.03 | *** |

Examples of Waxes Produced using 1-Hexene as Comonomer. In Table 9 *** indicates values that are not available. Branching was determined using $^{13}$C NMR and is reported quantitatively as the mole % butyl branching (C6) and mole % methyl branching (C3).

TABLE 10

| Example | Ethylene (gram) | Hexene (gram) | Temp (° C.) | Ethylene Pressure (bar) | Activity (g/g/Cr/h) | DSC Melting points (° C.) |
|---|---|---|---|---|---|---|
| 91 | 40 | 80 | 80 | 29.7 | 10592 | 72.85 |
| 92 | 100 | 50 | 120 | 29.7 | 60662 | 80.82 |
| 93 | 90 | 45 | 100 | 29.7 | 32693 | 113.59 |
| 94 | 50 | 50 | 120 | 29.7 | 15787 | 112.64 |
| 95 | 47.5 | 47.5 | 100 | 29.7 | 5598 | 92.56 |
| 96 | 38 | 38 | 80 | 29.7 | 7054 | 105.91 |

Examples of Waxes Produced using 1-Hexene as Comonomer and 400 mg Hydrogen

TABLE 11

| Example | Ethylene (gram) | Hexene (gram) | Temp (° C.) | Mn (g/mol) | Mw (g/mol) | Mz (g/mol) | Polydispersity |
|---|---|---|---|---|---|---|---|
| 79 | 39 | 39 | 120 | 51055 | 138610 | 634979 | 2.71 |
| 81 | 100 | 100 | 100 | 4211 | 19819 | 598511 | 4.71 |
| 82 | 100 | 100 | 80 | 6911 | 16700 | 47253 | 2.42 |
| 83 | 68 | 68 | 120 | 3619 | 20403 | 1289026 | 5.64 |
| 84 | 63.5 | 32 | 120 | 3985 | 7086 | 57234 | 1.78 |
| 85 | 100 | 50 | 80 | 9512 | 20868 | 53093 | 2.19 |
| 86 | 100 | 50 | 100 | 6374 | 13385 | 59328 | 2.10 |
| 87 | 100 | 50 | 120 | 4529 | 8834 | 46238 | 1.95 |
| 88 | 50 | 100 | 120 | 1562 | 3297 | 9029 | 2.11 |
| 89 | 50 | 100 | 100 | 4011 | 6573 | 18343 | 1.64 |
| 90 | 50 | 100 | 80 | 4805 | 7822 | 25554 | 1.63 |

Molecular weights of selected examples of ethylene/hexane copolymers. Units in g · mol$^{-1}$.
$M_n$: Number Average Molecular Weight,
$M_w$: Weight Average Molecular Weight,
$M_z$: Z-Average Molecular Weight Examples of Producing Polymers Using Various bis(diphenyl) Substituted Compounds as Ligands for the Catalyst Precursor Examples 97 and 98

In Table 12, a number of examples are given of experiments conducted using various ligands as part of the catalyst precursor. Reactions were run over an hour at ethylene pressures as specified in Table 12. In example 98 a comonomer (octene) was added to the amount of 40 ml (28.6 g) to the autoclave before pressurisation. After pressurising the autoclave to 30 bar, ethylene was fed on demand for the duration of the experiment (1 h). Ligand, metal and co-catalyst concentrations were kept the same as for examples 32-96.

active polymerization catalyst solution previously prepared was transferred to the autoclave under inert conditions using a syringe. Once the solvent, catalyst and co-catalyst solutions were added, the inlet port was closed as well as the nitrogen inlet line to the reactor and the ethylene inlet line was opened. The autoclave was pressurized to 30 bar ethylene and the rest of the ethylene was fed on demand to the autoclave after it reached the operating temperature of 100° C. The reaction was allowed to run for 30 minutes after which the reactor was cooled, vented and opened. The contents was added to a container containing acetone and thoroughly washed, filtered and dried under vacuum. The product was dried for 12 h at 60° C. under vacuum. The activity was calculated to be 5440 g polymer/g Ti/30 mm. The melting point as determined by DSC was found to be 138° C.

TABLE 12

| Examples | Monomer(s) | Reaction Temperature (° C.) | ligand | Ethylene Pressure (bar) | Activity (g/g/Cr/h) | Viscosity cP (s18) | DSC Melting points (° C.) | Mp onset (° C.) | Mp endset (° C.) |
|---|---|---|---|---|---|---|---|---|---|
| 97 | Et | 120 | 1,2bis(dpp)ethane | 30 | 11073 | 421 cP, 3 rpm, 150° C | *** | *** | *** |
| 98 | Et, octene | 80 | 1,2bis(dpp)ethane | 30 | 15361 | *** | 70.73 | 25.26 | 99.83 |

Examples of additional ligands. In Table 12 *** indicates values that are not available. In this table dpp is diphenylphosphino Examples of Producing Polymers Using TiCl$_4$ as a Source of the Transition Metal Example 99

Bis(diphenyl phosphine) iso-propyl amine (0.65 mmol) in toluene (15 ml) was added dropwise to 0.6 mmol TiCl$_4$ (1M solution in toluene) and stirred under nitrogen. An orange precipitate formed almost immediately. The toluene was removed with a syringe and the precipitate was washed with toluene and hexane and dried. The precipitate obtained will be referred to as TiCl$_4$(i-pr)PNP.

Before the polymerization experiment, the dried catalyst precursor (30 mg) was dissolved in 10 ml toluene and a-priori combined with 5 ml MAO (10% mass) to form the active polymerization catalyst. An amount of 300 ml heptane as solvent was added to a 1 L autoclave under inert conditions followed by an amount of 10 ml MAO. The Example Using a Group V Metal in Combination with a bis(diphenylphosphino)-methylamine Ligand as Polymerization Catalyst Precursor Example 100

In this example, 5×10$^{-3}$ mole (20 mg) bis(diphenylphosphino)methylamine was dissolved in 20 ml anhydrous toluene in a Schlenk tube under an inert atmosphere (nitrogen). An amount of 3.338×10$^{-3}$ mole (16 mg) vanadium acetylacetenoate was added to form the catalyst precursor and the contents was stirred for 1 h until a yellow solution was observed. In the meantime, a 1 L autoclave was filled with 300 ml of heptane under inert Schlenk conditions. The reactor was heated from room temperature to 100° C. During the heating process, when the reactor reached a temperature of 70° C., the catalyst precursor solution was removed from the Schlenk tube and transferred by means of a syringe to the autoclave.

Immediately following the transfer of the catalyst precursor, 10 ml methylaluminoxane (10 mass %) was added to the autoclave by means of a syringe. Following the addition of the catalyst activator, the autoclave was sealed, pressurized to 30 bar with ethylene and heated to 100° C. Upon reaching the required temperature and pressure, ethylene was added to the reactor on demand. The reaction was allowed to continue for 30 minutes after which the ethylene supply was stopped, the autoclave was cooled down and vented. The vanadium catalyst showed an activity of 1307 g polymer/g V/30 mm. The melting point was determined by DSC to be 134° C.

Examples of Tandem
Oligomerisation/Copolymerization Reactions

Example 101

Bis(diphenyl phosphine) iso-propyl amine (0.65 mmol) in toluene (15 ml) was added dropwise to 0.6 mmol $TiCl_4$ (1M solution in toluene) and stirred under nitrogen. An orange precipitate formed almost immediately. The toluene was removed with a syringe and the precipitate was washed with toluene and hexane and dried. The precipitate obtained will be referred to as $TiCl_4$(i-pr)PNP.

Before the tandem polymerization experiment, the dried catalyst precursor (30 mg) was dissolved in 10 ml toluene and a-priori combined with 5 ml MAO to form the active polymerization catalyst. An amount of 300 ml heptane was added to a 1 L autoclave under inert conditions followed by 10 ml MAO. In the meantime separately, a toluene solution containing 0.009 mmol $Cr(AcAc)_3$ was added to a solution of toluene containing 0.023 mmol bis(diphenylphosphine)methylamine and stirred for 5 minutes under an inert atmosphere. The solution of $Cr(AcAc)_3$ and bis(diphenylphosphine)methylamine prepared in this way when combined with the MAO in the reactor serves as an active tetramerization catalyst. To facilitate the discussion, this solution will be referred to as the "tetramerization" solution. Once the solvent and co-catalyst (MAO) solutions were added, the "tetramerization" solution was also added and formed an active tetramerization catalyst in-situ with the previously added MAO. The active polymerization catalyst solution previously prepared was transferred to the autoclave under inert conditions. The inlet port was closed as well as the nitrogen inlet line to the reactor and the ethylene inlet line was opened. The reactor was pressurized to 30 bar with ethylene and the rest of the ethylene was fed on demand. A temperature ramp procedure was followed in which the reaction was started at 40° C. for a period of 30 minutes after which the temperature was increased to 100° C. for a further period of 30 minutes. After 1 h, the autoclave was cooled, vented and the contents discharged into a container containing acetone and thoroughly filtered and washed. The product was thereafter dried for 12 h at 60° C. under vacuum. The activity of the polymerization catalyst was calculated to be 10880 g polymer/g Ti/h. The melting point was determined by DSC as 133° C.

The invention claimed is:

1. Process for producing a polymeric product by the polymerisation of at least one olefinic compound in the form of an olefin or a compound including an olefinic moiety comprising contacting the at least one olefinic compound with a polymerisation catalyst, wherein the catalyst comprises the combination of
   i) a source of a Group IV to VI transition metal; and
   ii) a ligating compound of the formula $(R^1)_m X^1(Y) X^2(R^2)_n$ wherein: $X^1$ and $X^2$ are independently selected from the group consisting of P, As, Sb, O, Bi, S, Se and N;

Y is a linking group between $X^1$ and $X^2$, provided that where Y includes or is at least one heteroatom (that is not being H or C) in the shortest link between $X^1$ and $X^2$ at least one of the said heteroatoms is not a ring member of a heteroaromatic ring structure;

m and n are independently 0, 1 or a larger integer; and $R^1$ and $R^2$ are independently a hydrocarbyl group which contains no polar substituent or a heterohydrocarbyl group which contains no polar substituent, and $R^1$ being the same or different when m>1, and $R^2$ being the same or different when n>1;

wherein when $R^1$ and $R^2$ are independently a hydrocarbyl group which contains at least one non-polar substituent, or a heterohydrocarbyl group which contains at least one non-polar substituent, the olefinic compound is contacted with the polymerisation catalyst at a reaction temperature from and above 70° C.; and when $R^1$ and $R^2$ are independently a hydrocarbyl group which contains no substituent or a heterohydrocarbyl group which contains no substituent, the olefinic compound is contacted with the polymerisation catalyst at a reaction temperature from and above 90° C.

2. The process of claim 1 wherein the polymeric product produced comprises a polyolefin wax.

3. The process of claim 1 wherein the olefinic compound comprises a single olefinic compound for producing a homopolymer.

4. The process of claim 1 wherein the olefinic compound comprises a mixture of olefinic compounds for producing a co-polymer.

5. The process of claim 3 wherein the olefinic compound is selected from the group consisting of ethylene, propylene, 1-butene, 1-pentene, 1-hexene, styrene, 1-heptene, 1-octene, 1-nonene, 1-decene, 3-methyl-1-butene, 3-methyl-1-pentene, 4-methyl-1-pentene, p-methyl styrene and 1-dodecene.

6. The process of claim 4 wherein one of the olefinic compounds in the mixture is ethylene and another olefinic compound in the mixture is an olefin with a terminal carbon to carbon double bond.

7. The process of claim 4 wherein at least one of the olefinic compounds of the mixture of olefinic compounds is prepared in situ by means of an oligomerisation process.

8. The process of claim 1 wherein $R^1$ and $R^2$ are independently a hydrocarbyl or heterohydrocarbyl group which contains no substituent, and the reaction temperature is between 100 and 300° C.

9. The process of claim 1 wherein $R^1$ and $R^2$ are independently a hydrocarbyl group which contains at least one non-polar substituent or a heterohydrocarbyl group which contains at least one non-polar substituent and the reaction temperature is above 80° C.

10. The process of claim 9 wherein the reaction temperature is between 100 and 300° C.

11. The process of claim 1 wherein the source of Group IV to VI transition metal is a source of V or Cr or Ti.

12. The process of claim 1 wherein $X^1$ and $X^2$ are the same and both are P.

13. The process of claim 1 wherein the ligating compound is of the formula

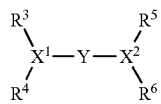

wherein $X^1$, $X^2$ and Y are as defined in claim 1; and $R^3$ to $R^6$ is each independently a hydrocarbyl group which includes no polar substituent or a heterohydrocarbyl group which includes no polar substituent.

14. The process of claim 13 wherein $X^1$ and $X^2$ are the same and both are P.

15. The process of claim 13 wherein each of $R^3$ to $R^6$ is an aromatic or heteroaromatic compound.

16. The process of claim 15 wherein each of $R^3$ to $R^6$ is an aromatic compound.

17. The process of claim 16 wherein at least two of $R^3$ to $R^6$ includes a non-polar substituent (other than H) as a non-ring atom bound to a ring atom of the aromatic ring structure adjacent to the aromatic ring atom bound to $X^1$ or $X^2$.

18. The process of claim 16 wherein none of $R^3$ or $R^6$ includes a substituent on the ring structure of the aromatic compound.

19. The process of claim 1 wherein Y is selected from any one of the group consisting of an organic linking group including a hydrocarbylene, a substituted hydrocarbylene, a heterohydrocarbylene or a substituted heterohydrocarbylene; an inorganic linking group including a single atom link (that is $X^1$ and $X^2$ are bound to the same atom) or an ionic link; methylene; 1,2-ethylene; 1,2-phenylene; 1,2-propylene; 1,2-catecholate; —(CH$_3$)N—N(CH$_3$)—; —B($R^7$)—; —Si($R^7$)$_2$—; —P($R^7$)—; and —N($R^7$)—, where $R^7$ is hydrogen, a hydrocarbyl group, a substituted hydrocarbyl group, a heterohydrocarbyl group or a halogen.

20. The process of claim 19 wherein Y is N($R^7$)— and $R^7$ is a hydrocarbyl group or a substituted hydrocarbyl group.

21. The process of claim 1 wherein Y is selected from the group consisting of
(phenyl)$_2$PN(methyl)P(phenyl)$_2$, (phenyl)$_2$PN(pentyl)P(phenyl)$_2$, (phenyl)$_2$PN(phenyl)P(phenyl)$_2$, (phenyl)$_2$PN(p-methoxyphenyl)P(phenyl)$_2$, (phenyl)$_2$PN(p-$^t$butylphenyl)P(phenyl)$_2$, (phenyl)$_2$PN((CH2)$_3$-N-morpholine)P(phenyl)$_2$, (phenyl)$_2$PN(Si(CH$_3$)$_3$)P(phenyl)$_2$, (((phenyl)$_2$P)$_2$NCH$_2$CH$_2$)$_3$N, (ethyl)$_2$PN(methyl)P(ethyl)$_2$, (ethyl)$_2$PN(isopropyl)P(phenyl)$_2$, (ethyl)(phenyl)PN(methyl)P(ethyl)(phenyl), (ethyl)(phenyl)PN(isopropyl)P(phenyl)$_2$, (phenyl)$_2$P(=Se)N(isopropyl)P(phenyl)$_2$, (phenyl)$_2$PCH$_2$CH$_2$P(phenyl)$_2$, (o-ethylphenyl)(phenyl)PN(isopropyl)P(phenyl)$_2$, (o-methylphenyl)$_2$PN(isopropyl)P(o-methylphenyl)(phenyl), (phenyl)$_2$PN(benzyl)P(phenyl)$_2$, (phenyl)$_2$PN(1-cyclohexyl-ethyl)P(phenyl)$_2$, (phenyl)$_2$PN[CH$_2$CH$_2$CH$_2$Si(OMe3)]P(phenyl)$_2$, (phenyl)$_2$PN(cyclohexyl)P(phenyl)$_2$, (phenyl)$_2$PN(2-methylcyclohexyl)P(phenyl)$_2$, (phenyl)$_2$PN(allyl)P(phenyl)$_2$, (2-naphthyl)$_2$PN(methyl)P(2-naphthyl)$_2$, (p-biphenyl)$_2$PN(methyl)P(p-biphenyl)$_2$, (p-methylphenyl)$_2$PN(methyl)P(p-methylphenyl)$_2$, (2-thiophenyl)$_2$PN(methyl)P(2-thiophenyl)$_2$, (phenyl)$_2$PN(methyl)N(methyl)P(phenyl)$_2$, (m-methylphenyl)$_2$PN(methyl)P(m-methylphenyl)$_2$, (phenyl)$_2$PN(isopropyl)P(phenyl)$_2$, (phenyl)$_2$P(=S)N(isopropyl)P(phenyl)$_2$, (o-ethylphenyl)$_2$PN(methyl)P(o-ethylphenyl)$_2$, (o-isopropylphenyl)$_2$PN(methyl)P(o-isopropylphenyl)$_2$, (o-methylphenyl)$_2$PN(methyl)P(o-methylphenyl)$_2$, (o-ethylphenyl)$_2$PN(methyl)P(o-ethylphenyl)(phenyl), (o-ethylphenyl)$_2$PN(isopropyl)P(o-ethylphenyl)$_2$, (o-isopropyl)$_2$PN(isopropyl)P(o-isopropyl)$_2$, (o-methyl)$_2$PN(isopropyl)P(o-methyl)$_2$, (o-t-butylphenyl)$_2$PN(methyl)P(o-t-butylphenyl)$_2$, (o-t-butylphenyl)$_2$PN(isopropyl)P(o-t-butylphenyl)$_2$, (o-ethylphenyl)$_2$PN(pentyl)P(o-ethylphenyl)$_2$, (o-ethylphenyl)$_2$PN(phenyl)P(o-ethylphenyl)$_2$, (o-ethylphenyl)$_2$PN(p-methoxyphenyl)P(o-ethylphenyl)$_2$, (o-ethylphenyl)$_2$PN(benzyl)P(o-ethylphenyl)$_2$, o-ethylphenyl)$_2$PN(1-cyclohexylethyl)P(o-ethylphenyl)$_2$, (o-ethylphenyl)$_2$PN(2-methylcyclohexyl)P(o-ethylphenyl)$_2$, (o-ethylphenyl)$_2$PN(cyclohexyl)P(o-ethylphenyl)$_2$, (o-ethylphenyl)$_2$PN(allyl)P(o-ethylphenyl)$_2$, (3-ethyl-2-thiophenenyl)$_2$PN(methyl)P(3-ethyl-2-thiophenenyl)$_2$, (2-ethyl-3-thiophenenyl)$_2$PN(methyl)P(2-ethyl-3-thiophenenyl)$_2$, 1,2-bis-(diphenylphosphino)-ethane, 1,3-bis-(diphenylphosphino)-propane, 1,4-bis-(diphenylphosphino)-butane, 1-(diphenylphosphino)-2-(ethylsulfanyl)-ethane and (2-ethyl-4-pyridyl)$_2$PN(methyl)P(2-ethyl-4-pyridyl)$_2$.

22. The process of claim 1 wherein the catalyst includes one or more activators.

23. The process of claim 22 wherein the activator is selected from the group consisting of an organoaluminium compound and an organoboron compound.

24. The process of claim 1 wherein selectively towards the synthesis of polymers or waxes range from 30 wt % to 100 wt %.

25. The process of claim 1 which includes the step of adding hydrogen to the combination of the catalyst and the at least one olefinic compound.

26. The process of claim 1 wherein the at least one olefinic compound is contacted with a further catalyst in the form of an oligomerisation catalyst.

27. The process of claim 26 wherein the oligomerisation catalyst and polymerisation catalysts are both present and contacted with the olefinic compound.

* * * * *